3,151,130
TRI-EPOXY ACETALS
Benjamin Phillips and Paul S. Starcher, Charleston, W. Va., assignors to Union Carbide Corporation, a corporation of New York
No Drawing. Filed Dec. 29, 1961, Ser. No. 163,071
5 Claims. (Cl. 260—348)

This invention relates in general to a new class of organic compounds and more particularly to novel epoxy acetals and methods for their preparation.

This application is a continuation-in-part of application Serial No. 820,871, filed June 17, 1959, now U.S. Patent No. 3,018,294. Application Serial No. 820,871 is a continuation-in-part of application Serial No. 645,010, filed March 11, 1957, now abandoned.

The novel epoxy acetals of the present invention can be conveniently represented by the following general formula:

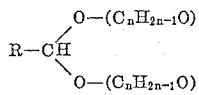

wherein R is an epoxyalkoxyalkyl of from 5 to 22 carbon atoms, more preferably 5 to 18 carbon atoms;

$$-(C_nH_{2n-1}O)$$

is an epoxy-alkyl group wherein O represents oxirane oxygen; and $n$ is an integer from 3 to 22 and preferably 3 to 18; with the limitation that the epoxy groups are at least one carbon atom removed from etheric oxygens.

Due to the presence of the vicinal epoxy group,

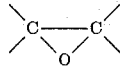

the novel compounds of this invention are useful in the preparation of epoxy resins. These epoxy acetals form excellent compositions when hardened with polyamines, polyacids, anhydrides, and the like. Additionally, the novel epoxy acetals of this invention are valuable as stabilizers for chlorine-containing resins. For example, the novel compounds of this invention have been found useful as palsticizers with vinyl halide resins. By incorporating into the resin from about 5 to about 50 percent by weight of these novel epoxy acetals, a plasticized product is obtained which possesses useful resilient and flexible characteristics. The vinyl halide resins which can be satisfactorily plasticized by the compounds of this invention can be any vinyl halide polymer such as polyvinyl chloride, vinyl chloride-vinyl acetate copolymers, vinyl chloride-acrylonitrile copolymers, vinyl chloride-vinylidene chloride copolymers, vinyl chloride-vinylidene chloride-acrylonitrile copolymers, and the like. The compounds of this invention may be used alone or in conjunction with conventional plasticizers.

It is accordingly an object of the present invention to provide new organic compounds which are suitable for use in the plastic and resin field. Another object is to provide new compositions of matter comprising tri-epoxy acetals. A further object of the present invention is to provide novel compounds comprising the tri-(epoxyalkoxy) alkanes. Another object is to provide novel acetals containing more than one epoxy group. A still further object is to provide processes for the preparation of the novel compositions of matter of this invention. These and other objects will readily become apparent to those skilled in the art in the light of the teachings herein set forth.

In its broad aspect, the novel acetals encompassed by this invention are the tri-(epoxyalkoxy) alkanes of the aforementioned formula.

Illustrative novel epoxy acetals include, among others,
1,1,3-tri-(2,3-epoxypropoxy)propane,
1,1,3-tri-(2,3-epoxypropoxy)butane,
1,1,3-tri-(2,3-epoxypropoxy)pentane
1,1,3-tri-(2,3-epoxypropoxy)hexane
1,1,3-tri-(2,3-epoxypropoxy)heptane
1,1,6-tri-(2,3-epoxypropoxy)octane
1,1,8-tri-(2,3-epoxypropoxy)decane
1,1,10-tri-(2,3-epoxypropoxy)dodecane
1,1,12-tri-(2,3-epoxypropoxy)tetradecane
1,1,14-tri-(2,3,epoxypropoxy)hexadecane
1,1,3-tri-(2,3-epoxybutoxy)propane
1,1,3-tri-(2,3-epoxybutoxy)butane
1,1,3-tri-(2,3-epoxybutoxy)pentane
1,1,3-tri-(2,3-epoxybutoxy)hexane
1,1,3-tri-(2,3-epoxybutoxy)heptane
1,1,6-tri-(2,3-epoxybutoxy)octane
1,1,8-tri-(2,3-epoxybutoxy)decane
1,1,12-tri-(2,3-epoxybutoxy)tetradecane
1,1,15-tri-(2,3-epoxybutoxy)pentadecane
1,1,3-tri-(4,5-epoxypentoxy)propane
1,1,4-tri-(4,5-epoxypentoxy)butane
1,1,6-tri-(4,5-epoxypentoxy)hexane
1,1,8-tri-(4,5-epoxypentoxy)octane
1,1,14-tri-(4,5-epoxypentoxy)tetradecane
1,1,3-tri-(9,10-epoxydecoxy)propane
1,1,4-tri-(9,10-epoxydecoxy)butane
1,1,6-tri-(9,10-epoxydecoxy)octane
and the like.

The epoxy acetals of this invention can be prepared by the epoxidation of the olefinic double bonds of the corresponding unsaturated aldehyde dialkenyl acetals with suitable epoxidizing agents. The aldehyde dialkenyl acetal starting materials can be represented by the formula:

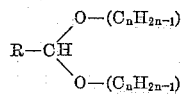

wherein R and $n$ are previously defined. Typical epoxidizing agents are the peracids, e.g., peracetic acid, perpropionic acid, perbenzoic acid, and the like, or the aldehyde monoperacylates, e.g., acetaldehyde monoperacetate and propionaldehyde monoperpropionate. Of these epoxidizing agents, the 2 to 3 carbon aliphatic peracids, particularly peracetic acid, and the 2 to 3 carbon aliphatic aldehyde mono-(2 to 3 carbon aliphatic)-peracylates, particularly acetaldehyde monoperacetate, are preferred mainly from the aspect of being economically available and capable of producing commercially acceptable yields. The epoxidation employing a peracid can be represented by the following equation:

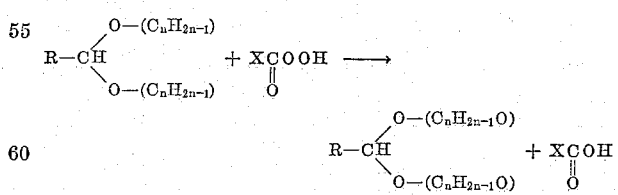

wherein R and $n$ are as previously defined,

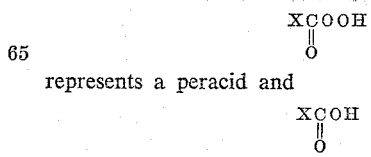

represents a peracid and $$\overset{XCOH}{\underset{O}{\|}}$$

represents the residue from the peracid after epoxidation. Epoxidations employing aldehyde monoperacylates can be represented similarly. Many epoxidizing agents in crystalline form or highly concentrated solutions are highly explosive when exposed to physical shocks, sometimes of the very slightest magnitude. Possible explosion hazards are avoided by preventing the formulation of crystalline forms or highly concentrated solutions of epoxidizing agent. This can be safely accomplished by employing in the epoxidation solutions containing below about 60 weight percent of epoxidizing agent. Ethyl acetate and acetone are two of the many solvents available for peracetic acid or acetaldehyde monoperacetate. It is particularly important that the epoxidation be carried out in the absence of heavy metal ions or strong acids and water so as to avoid the hydrolysis of the easily hydrolyzable acetal starting materials and products.

In a preferred embodiment of the present invention, the epoxidation of the unsaturated starting materials is carried out at temperatures in the range of from $-25°$ C. to $150°$ C. At the lower temperatures, the rate of epoxidation is slow, while at the higher temperatures, the rate is faster necessitating precautions to prevent further reaction of the epoxide groups. In order to avoid undesired side reactions and to provide a suitable reaction rate, temperatures in the range of from $10°$ C. to $90°$ C. are preferable. In the practice of the invention, the unsaturated starting material is conveniently charged to a reaction vessel and the approprite quantity of peracetic acid is added. The mole ratio is not necessarily critical and can be varied over a wide range. The reaction is allowed to proceed for a time sufficient to consume approximately the theoretical quantity of peracetic acid needed to effect epoxidation. The amount of peracetic acid consumed can be determined by periodic tests for peracetic acid. Usually from about one to about ten hours is sufficient for the reaction to be completed at the preferred temperature. It is preferred, although not absolutely necessary, to separate the by-product acetic acid from the epoxide rapidly, since the acetic acid will react with the epoxide to form undesired products, decreasing the overall yield. Finally, the reaction mixture is subjected to conventional recovery procedures to isolate the epoxy acetal. Extraction with a suitable solvent, continuous distillation, or distillation under reduced pressures all are applicable to the recovery of the epoxidized compound.

The aldehyde dialkenyl acetals which are starting materials in the production of the acetals of this invention can be prepared by methods known to the art. For example, 1,1,3-triallyloxybutane is a known compound and can be prepared by the reaction of crotonaldehyde with allyl alcohol. The reaction of alkenyl alcohols and aldehydes in the presence of calcium chloride to give aldehyde dialkenyl acetals is described by Hurd and Pollack, J.A.C.S., 60, 1906 (1938). Several other methods for preparing the starting compounds are known.

The following examples are illustrative:

EXAMPLE I

*Preparation of 1,1,3-Tri-(2,3-Epoxypropoxy)-Butane*

To 452 grams 1,1,3-triallyloxybutane (from the reaction of crotonaldehyde with allyl alcohol) which was heated with stirring to $50°$ C.–$55°$ C., there was added 1955 grams of a 27.2 percent solution of peracetic acid in ethyl acetate dropwise over a period of five hours. After an additional three hours the reaction was 91 percent complete as indicated by analysis for unreacted peracetic acid. The cooled reaction mixture was passed through a steam-heated stripper once at a pressure of 50 millimeters of mercury and again at 5 millimeters pressure to remove the volatiles from the product. The stripped product was then flash-distilled to give an almost colorless liquid, which upon analysis gave 80 percent as 1,1,3-tri-(2,3-epoxypropoxy)butane by the pyridine hydrochloride method, in 63 percent yield based on peracetic acid. A sample of this product was redistilled through a short Vigreaux column to give colorless material, 87.5 percent as 1,1,3-tri-(2,3-epoxypropoxy)butane, boiling point $154°/0.6$ millimeters, $n\ 30/D\ 1.4593$.

EXAMPLE II

*Preparation of 1,1,3-Tri-(2,3-Epoxypropoxy)-Propane*

To 424 grams of 1,1,3-triallyloxypropane, prepared from allyl alcohol and acrolein by the method outlined in U.S. Patent 2,561,254, which was maintained with stirring at $55°$ C.–$60°$ C., there was added 1980 grams of 26.9 percent solution of peracetic acid in ethyl acetate dropwise over a period of five hours. After an additional two hours at $60°$ C., the reaction was 96.7 percent complete as indicated by titration for unreacted peracetic acid. The reaction mixture was passed through a steam-heated stripper once at a pressure of 50 millimeters of mercury and again at a pressure of 7 millimeters to remove the volatiles from the product. The stripped product was then flash distilled to give 285 grams of 1,1,3-tri-(2,3-epoxypropoxy)propane which contained 10.55 percent oxirane oxygen as determined by the pyridine hydrochloride method.

Although the invention has been illustrated by the preceding examples, the invention is not to be construed as limited to the materials employed in the above examples, but rather, the invention encompasses the generic invention as hereinbefore disclosed. Various modifications and embodiments of this invention can be made without departing from the spirit and scope thereof.

What is claimed is:

1. An epoxy acetal of the formula:

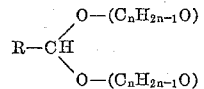

wherein R is an epoxyalkoxyalkyl of from 5 to 22 carbon atoms; $-(C_nH_{2n-1}O)$ is an epoxyalkyl group wherein O is oxirane oxygen; and $n$ is an integer of from 3 to 22; with the proviso that the epoxy groups are at least one carbon atom removed from etheric oxygen atoms.

2. 1,1,3-tri-(epoxyalkoxy)propane wherein said epoxyalkoxy contains from 3 to 22 carbon atoms.

3. 1,1,3-tri-(epoxyalkoxy)butane wherein said epoxyalkoxy contains from 3 to 22 carbon atoms.

4. 1,1,3-tri-(2,3-epoxypropoxy)propane.

5. 1,1,3-tri-(2,3-epoxypropoxy)butane.

References Cited in the file of this patent

UNITED STATES PATENTS

| | | |
|---|---|---|
| 2,719,089 | Lovell | Sept. 27, 1955 |
| 3,081,343 | Merten | Mar. 12, 1963 |

OTHER REFERENCES

Sykes: J. Soc. Leather Trades Chemists, 41, 199–206, June 1957 (page 200 relied on).

C.A. 1957 Subject Index, vol. 51, page 4525s.